3,408,213
GLASS FIBER COMPOSITIONS
Jason D. Provance, Glendora, Albert Lewis, Covina, and Lawrence W. Kelley, West Covina, Calif., assignors to Aerojet-General Corporation, Azusa, Calif., a corporation of Ohio
No Drawing. Filed Oct. 10, 1963, Ser. No. 315,386
14 Claims. (Cl. 106—50)

ABSTRACT OF THE DISCLOSURE

An improved glass composition, especially suitable for glass fiber manufacture having high tensile strength and containing typically 52% to 60% silica, 20% to 28% aluminum oxide, 1.38% to 7.5% sodium oxide, 6.53% to 12.5% magnesium oxide, 3% to 4.5% zirconium oxide, up to about 1% iron oxide, 0% to 4.5% boron oxide, 0% to about 4% calcium oxide with the sum of the boron oxide and sodium oxide ranging from about 3% to about 7.5% and the sum of the calcium oxide and magnesium oxide ranging from 9% to about 12.5%.

---

This invention relates to glass compositions and particularly to glass compositions and fibers having high strength, high modulus of elasticity and good durability at high temperatures.

There has been a demand for fiber glass compositions which can be successfully drawn into fibrous form, particularly for use in laminates and structural materials where high strength, high modulus of elasticity and high temperature resistance are important. The problems of achieving these characteristics has long been recognized in the glass art; however, no completely satisfactory composition has been available for forming long continuous length glass fibers having the desired characteristics. High temperature glass compositions have heretofore been produced but they are subject to the drawbacks of having a short working temperature range, and to the producing of a preponderance of short fibers which are not adaptable to high strength structural components.

It has been demonstrated in prior art glasses that favorable filament properties such as, high strength, high modulus of elasticity, and good temperature resistance, can be obtained from a magnesia, alumina-silica glass. While filament properties from this glass are good, inherent problems are associated with producing this glass from a multihole furnace.

Thus, an object of this invention is to provide a glass which will possess the properties lacking in the glass of the prior art.

A further object of this invention is to lower the initial melting temperature for the glass system so that difficulties encountered with batch melting can be avoided.

A further object of this invention to provide a glass that possesses a viscosity conducive to fiber formation and with the ability to be fiberized in continuous lengths and for extended periods of time.

A still further object is to provide a glass composition with a lower liquidus temperature so it will not be necessary to use high melting temperatures or to fiberize the glass at a temperature dangerously close to its liquidus temperature.

Another object is to provide a glass which has high strength that can be drawn into long continuous length glass fibers.

The strong attack from molten glass on retaining walls of the furnace or melting units is well known in the art. The chemical attack from the glass making oxide constituents is accelerated by the elevated temperatures necessary for reducing the batch materials to a molten-glassy state. When this attack occurs the refractory container walls are slowly dissolved in the glass. Unfortunately, most molten glasses can absorb only a small amount of refractory before undergoing considerable change in properties. When this low critical value is reached, the liquidus temperature of the glass rises quickly and the possibilities of devitrification are likely. To avoid this crystal formation it is then necessary to raise the temperature once again above the liquidus temperature. This, in turn, starts another progression of glass contamination from dissolved refractory, until the melting temperature required for the glass is so excessive that it is impractical or impossible because of the limits of the furnace to attain the high temperature. A lower initial melting temperature avoids these difficulties.

In the previous glasses, a low $SiO_2$ content caused the glass at its liquidus temperature to be very low in viscosity. When the viscosity is too low, the glass is too fluid and drops from the fiber forming orifice in small balls of molten glass. Raising the viscosity to permit fiber formation can be accomplished by decreasing the temperature of the glass. However, when this is done devitrification of the glass at the forming tip occurs and prevents drawing the glass free from strength-reducing inclusions. For most glasses, the attenuating temperature for fiber formation is dangerously close to the liquidus or devitrification temperature. The present glass invention with a higher $SiO_2$ content has been fiberized for periods well over one hour in continuous fashion. With an increased viscosity, the ability of the atoms to re-unite in crystal form at the orifice forming tip is prevented. It has been demonstrated that continuous fibers can be drawn for extended periods of time by maintaining the glass cone at the orifice tip at 2,450° F. With prior glasses of this type a continuous fiber could only be drawn at this temperature for periods of from 5 to 10 minutes.

The present invention provides glass which is capable of being drawn continuously into roving or parallel mat form and which is characterized as having high strength, a high modulus of elasticity and good durability at high temperatures. The material of this invention differs from high temperature glasses heretofore employed in its resistance to devitrification. Thus, the present glass has improved strength and is free from impurities so that continuous length fibers may be produced.

The glass of the present invention may be used in any area where high strength and a high modulus of elasticity are required. This includes its use in a resinous or plastic matrix for rocket motor cases and as a reinforcement for inorganic as well as organic matrices.

The compositions of the present invention provide approximately a 50% increase in tensile strength and approximately a 20% increase in modulus of elasticity over known commercially available compositions. The compositions of the present invention have the following broad composition limits:

About 52% to about 60% silica
About 20% to about 28% aluminum oxide
About 1.38% to about 7.5% sodium oxide
About 6.5% to about 12.5% magnesium oxide
About 3% to about 4.5% zirconium oxide
Up to about 1% iron oxide
0 to about 4.5% boron oxide
0 to about 4% calcium oxide the sum of the boron oxide and sodium oxide ranging from about 3% to about 7.5% and the sum of the calcium oxide and magnesium oxide ranging from about 9% to about 12.5%.

Where the highest filament properties are not required, boron oxide can be substituted for part of the sodium oxide. Advantages in melting can be achieved by substituting calcium oxide for magnesium oxide. A small amount of iron oxide may be present as an impurity or added in amounts up to 1 percent to aid heat transfer and melting.

While compositions falling within the above range give desirable results, best filament properties are obtained within the following more narrow composition limits:

About 54% to about 57% silica
About 23.5% to about 26.5% aluminum oxide
About 4.0% to about 7.0% sodium oxide
About 9.5% to about 11.0% magnesium oxide
About 4.0% to about 4.5% zirconium oxide
Up to about 1% iron oxide Trace impurities are also present in the glass but occur in such small quantities, less than about 0.02%, that they do not affect the composition.

The glasses of the present invention are prepared by melting batches within the following approximate ranges at temperatures of between about 2500° F. to about 2900° F. in conventional refractory containers. The batch compositions are based upon 1000 parts sand by weight indicating the broad range of proportions by weight of the components:

Sand, 1000 parts
Aluminum hydrate about 590 parts to about 720 parts
Sodium carbonate about 100 parts to about 215 parts
Magnesium carbonate about 415 parts to about 500 parts
Zirconium silicate about 90 parts to about 116 parts The batch components are weighed in a dry powdered or granular form and mixed in a conventional mixer or tumbler such as a cement mixer. The dry batch may then be dampened with water to prevent loss from dusting while the batch is being transferred to the furnace. The batch is then placed into the furnace which has already been brought to the desired melt temperature. No mechanical stirring of the batch in the furnace is necessary since the bubbles which form during the melting process act to provide circulation. Samples of glass are taken from the furnace at periodic intervals to determine when the glass has reached uniform composition. This is generally after the sand, which is last to melt completely, has dissolved.

The glass may then flow directly to a bushing for fiber production if a direct melt process is used or the glass may be cooled to a frit or marble form and then remelted in a fiber bushing if a marble feeding process is utilized.

The molten glass is drawn into fibers on a conventional drawing wheel at speeds up to 12,000 feet per minute and temperatures of between about 2400° F. to about 2800° F. Speeds of between about 5000 to about 10,000 feet per minute are preferred in order to give optimum filament properties.

The fibers may be drawn from about 0.0001 to about 0.004 inch in diameter although diameters of between about 0.00035 and 0.0004 inch are preferred for maximum fiber properties.

To further illustrate the invention, there are presented the following examples in which all parts and percentages are by weight unless otherwise indicated:

EXAMPLE I

The following batch was mixed in a dry granular form as discussed above and melted in a conventional refractory furnace at a temperature between 2500° F. and 2900° F.:

| | Parts |
|---|---|
| Sand | 320.0 |
| Aluminum hydrate | 224.8 |
| Sodium carbonate | 70.4 |
| Magnesium carbonate | 137.4 |
| Zirconium silicate | 38.8 |

The following glass was obtained:

About 54.82% $SiO_2$
About 24.04% $Al_2O_3$
About 6.70% $Na_2O$
About 9.50% $MgO$
About 4.15% $ZrO_2$
Less than 1% $Fe_2O_3$ The glass was cooled to frit form and remelted in a conventional resistance heated bushing for fiberizing. For a continuous fiberizing run with this glass, in a glass fiber bushing, a temperature of 2550° F. was used. No discontinuities or filament breakage occurred for over a one hour period during this experiment at drawing speeds up to 10,000 feet per minute. Devitrification at the orifice was not prevalent with this composition and the liquidus temperature of about 2400° F. is well within the safe operating limits of furnace materials. Tensile tests on monofilament from this glass reveal an average strength of 730,000 p.s.i. and modulus of elasticity of 14.5 million p.s.i.

The following batch compositions were mixed and melted as discussed above and formed into fibers as described in Example I in the following Examples II through X:

EXAMPLE II

| | Parts |
|---|---|
| Sand | 338.0 |
| Aluminum hydrate | 237.4 |
| Sodium carbonate | 71.6 |
| Magnesium carbonate | 161.0 |
| Zirconium silicate | 41.0 |

The following glass was obtained:

About 54.82% $SiO_2$
About 24.04% $Al_2O_3$
About 6.46% $Na_2O$
About 10.53% $MgO$
About 4.15% $ZrO_2$ The molten glass was formed into fibers on a conventional drawing wheel at 2600° F. at speeds up to 10,000 feet per minute. The glass fibers were found to have the following properties:

Average tensile strength _____ thousand p.s.i.__ 653
Average modulus of elasticity _____ million p.s.i.__ 14.6

When Example II is repeated using sufficient aluminum hydrate to give an alumina content of about 28%, a good glass is obtained.

EXAMPLE III

| | Parts |
|---|---|
| Sand | 338.0 |
| Aluminum hydrate | 215.2 |
| Sodium carbonate | 46.8 |
| Magnesium carbonate | 152.2 |
| Zirconium silicate | 38.8 |

The following glass was obtained:

About 57.82% $SiO_2$
About 23.04% $Al_2O_3$
About 4.46% $Na_2O$
About 10.53% $MgO$
About 4.15% $ZrO_2$ The molten glass was formed into fibers on a conventional drawing wheel at 2560° F. at speeds up to 10,000 feet per minute. The glass fibers were found to have the following properties:

Average tensile strength _____ thousand p.s.i__ 686
Average modulus of elasticity _____ million p.s.i__ 14.5

When Example III is repeated using sufficient sand to give a silica content of about 52%, a good glass is obtained.

EXAMPLE IV

| | Parts |
|---|---|
| Sand | 340.0 |
| Aluminum hydrate | 190.8 |
| Sodium carbonate | 45.4 |
| Magnesium carbonate | 147.8 |
| Zirconium silicate | 37.6 |

The following glass was obtained:

About 59.82% $SiO_2$
About 21.04% $Al_2O_3$
About 4.46% $Na_2O$
About 10.53% MgO
About 4.15% $ZrO_2$ The molten glass was formed into fibers on a conventional drawing wheel at 2540° F. at speeds up to 10,000 feet per minute. The glass fibers were found to have the following properties:

Average tensile strength _____ thousand p.s.i__ 666
Average modulus of elasticity _____ million p.s.i__ 14.4

When Example IV is repeated using sufficient sodium carbonate to give a sodium oxide content of about 7.5%, a good glass is obtained.

EXAMPLE V

| | Parts |
|---|---|
| Sand | 340.0 |
| Aluminum hydrate | 183.4 |
| Sodium carbonate | 47.8 |
| Magnesium carbonate | 140.2 |
| Zirconium silicate | 37.6 |

The following glass was obtained:

About 60.00% $SiO_2$
About 20.29% $Al_2O_3$
About 4.71% $Na_2O$
About 10.03% MgO
About 4.15% $ZrO_2$
Less than 1% $Fe_2O_3$ The molten glass was formed into fibers on a conventional drawing wheel at 2560° F. at speeds up to 10,000 feet per minute. The glass fibers were found to have the following properties:

Average tensile strength _____ thousand p.s.i__ 673
Average modulus of elasticity _____ million p.s.i__ 14.7

EXAMPLE VI

| | Parts |
|---|---|
| Sand | 320.0 |
| Aluminum hydrate | 221.6 |
| Sodium carbonate | 45.8 |
| Magnesium carbonate | 149.4 |
| Zirconium silicate | 38.2 |

The following glass was obtained:

About 55.82% $SiO_2$
About 24.16% $Al_2O_3$
About 4.46% $Na_2O$
About 10.53% MgO
About 4.15% $ZrO_2$ The molten glass was formed into fibers on a conventional drawing wheel at 2470° F. at speeds up to 10,000 feet per minute. The glass fibers were found to have the following properties:

Average tensile strength _____ thousand p.s.i__ 539
Average modulus of elasticity _____ million p.s.i__ 15.8

EXAMPLE VII

| | Parts |
|---|---|
| Sand | 340.0 |
| Aluminum hydrate | 190.8 |
| Sodium carbonate | 45.4 |
| Magnesium carbonate | 147.8 |
| Zirconium silicate | 37.6 |

The following glass was obtained:

About 59.82% $SiO_2$
About 21.04% $Al_2O_3$
About 4.46% $Na_2O$
About 10.53% MgO
About 4.15% $ZrO_2$ The molten glass was formed into fibers on a conventional drawing wheel at 2540° F. at speeds up to 10,000 feet per minute. The glass fibers were found to have the following properties:

Average tensile strength _____ thousand p.s.i__ 666
Average modulus of elasticity _____ million p.s.i__ 14.4

EXAMPLE VIII

| | Parts |
|---|---|
| Sand | 340.0 |
| Aluminum hydrate | 238.6 |
| Sodium carbonate | 77.4 |
| Magnesium hydroxide | 93.6 |
| Zirconium silicate | 41.2 |

The following glass was obtained:

About 54.82% $SiO_2$
About 24.04% $Al_2O_3$
About 6.96% $Na_2O$
About 10.03% MgO
About 4.15% $ZrO_2$ The molten glass was formed into fibers on a conventional drawing wheel at 2600° F. at speeds up to 10,000 feet per minute. The glass fibers were found to have the following properties:

Average tensile strength _____ thousand p.s.i__ 620
Average modulus of elasticity _____ million p.s.i__ 14.6

When Example VIII is repeated using sufficient magnesium carbonate to give a magnesium oxide content of about 12.5%, a good glass is obtained.

EXAMPLE IX

| | Parts |
|---|---|
| Sand | 318.0 |
| Aluminum hydrate | 241.8 |
| Sodium borate | 49.8 |
| Magnesium carbonate | 91.6 |
| Crushed limestone | 45.4 |
| Zirconium silicate | 38.6 |

The following glass was obtained:

About 54.82% $SiO_2$
About 26.04% $Al_2O_3$
About 1.38% $Na_2O$
About 3.08% $B_2O_3$
About 6.53% MgO
About 4.00% CaO
About 4.15% $ZrO_2$ The molten glass was formed into fibers on a conventional drawing wheel at 2750° F. at a speed of 4,000 feet per minute. The glass fibers were found to have the following properties:

Average tensile strength _____thousand p.s.i__ 748
Average modulus of elasticity ____ millions p.s.i. __ 14.1

EXAMPLE X

| | Parts |
|---|---|
| Sand | 318.0 |
| Aluminum hydrate | 271.0 |
| Sodium borate | 53.0 |
| Magnesium carbonate | 157.4 |
| Zorconium silicate | 40.2 |

The following glass was obtained:

About 52.82% $SiO_2$
About 28.00% $Al_2O_3$
About 1.38% $Na_2O$
About 10.53% MgO
About 4.15% $ZrO_2$
About 3.08% $B_2O_3$ The molten glass was formed into fibers on a conventional drawing wheel at 2690° F. at a speed of 5,000 feet per minute. The glass fibers were found to have the following properties:

Average tensile strength _____thousand p.s.i__ 681
Average modulus of elasticity _____million p.s.i__ 12.6

Due to the fact that the glasses of this invention were melted and fiberized under various conditions and in furnaces of varying design, the melting temperature for each individual glass is not listed. Because of these variables, melting temperatures can be misleading. Variables other than composition and glass fiber furnace design affect the temperatures necessary for fiberization of the glass. These variables include head of glass (level in furnace), rate of draw, and the environmental conditions directly beneath the furnace such as the cooling method used. Generally a water cooling system is satisfactory. The glasses have been melted in bulk form in commercially available containers fired by natural gas and air mixtures at temperatures between about 2500° F. and 2900° F. and in fiber form, in precious metal, preferably platinum, resistance heated bushings at temperatures varying from about 2400° F. to about 2800° F. depending upon the above-mentioned variables.

The usual impurities which are present in the glasses such as $TiO_2$ occur in such small quantity, less than about 0.02%, that they do not affect the composition.

While preferred embodiments of the invention have been described above, it will be understood that this invention may be otherwise variously embodied within the scope of the following claims.

We claim:
1. A glass composition consisting essentially of:
about 52% to about 60% silica
about 20% to about 28% aluminum oxide
about 1.38% to about 7.5% sodium oxide
about 6.53% to about 12.5% magnesium oxide
about 3% to about 4.5% zirconium oxide
up to about 1% iron oxide
0 to about 4.5% boron oxide
0 to about 4% calcium oxide
the sum of the boron oxide and sodium oxide ranging from about 3% to about 7.5% and the sum of the calcium oxide and magnesium oxide ranging from about 9% to about 12.5%.

2. A glass composition consisting essentially of:
about 54% to about 57% silica
about 23.5% to about 26.5% aluminum oxide
about 4.0% to about 7.0% sodium oxide
about 9.5% to about 11.0% magnesium oxide
about 4.0% to about 4.5% zirconium oxide
up to about 1% iron oxide 3. A high tensile glass fiber consisting essentially of:
about 52% to about 60% silica
about 20% to about 28% aluminum oxide
about 3% to about 7.5% sodium oxide
about 9% to about 12.5% magnesium oxide
about 3% to about 4.5% zirconium oxide
up to about 1% iron oxide
0 to about 4.5% boron oxide
0 to about 4% calcium oxide
the sum of the boron oxide and sodium oxide ranging from about 3% to about 7.5 and the sum of the calcium oxide and magnesium oxide ranging from about 9% to about 12.5%.

4. A high tensile glass fiber consisting essentially of:
about 54% to about 57% silica
about 23.5% to about 26.5% aluminum oxide
about 4.0% to about 7.0% sodium oxide
about 9.5% to about 11.0% magnesium oxide
about 4.0% to about 4.5% zirconium oxide
up to about 1% iron oxide 5. A glass composition consisting essentially of:
about 54.82% $SiO_2$
about 24.04% $Al_2O_3$
about 6.70% $Na_2O$
about 9.50% MgO
about 4.15% $ZrO_2$
less than 1% $Fe_2O_3$ 6. A glass composition consisting essentially of:
about 59.82% $SiO_2$
about 21.04% $Al_2O_3$
about 4.46% $Na_2O$
about 10.53% MgO
about 4.15% $ZrO_2$ 7. A glass composition consisting essentially of:
about 60.00% $SiO_2$
about 20.29% $Al_2O_3$
about 4.71% $Na_2O$
about 10.03% MgO
about 4.15% $ZrO_2$
less than 1% $Fe_2O_3$ 8. A glass composition consisting essentially of:
about 59.82% $SiO_2$
about 21.04% $Al_2O_3$
about 4.46% $Na_2O$
about 10.53% MgO
about 4.15% $ZrO_2$ 9. A glass composition consisting essentially of:
about 54.82% $SiO_2$
about 26.04% $Al_2O_3$
about 1.38% $Na_2O$
about 3.08% $B_2O_3$
about 6.53% MgO
about 4.00% CaO
about 4.15% $ZrO_2$ 10. A high tensile glass fiber consisting essentially of:
about 54.82% $SiO_2$
about 24.04% $Al_2O_3$
about 6.70% $Na_2O$
about 9.50% MgO
about 4.15% $ZrO_2$
less than 1% $Fe_2O_3$ 11. A high tensile glass fiber consisting essentially of:
about 59.82% $SiO_2$
about 21.04% $Al_2O_3$
about 4.46% $Na_2O$
about 10.53% MgO
about 4.15% $ZrO_2$ 12. A high tensile glass fiber consisting essentially of:
about 60.00% $SiO_2$
about 20.29% $Al_2O_3$
about 4.71% $Na_2O$
about 10.03% MgO
about 4.15% $ZrO_2$
less than 1% $Fe_2O_3$ 13. A high tensile glass fiber consisting essentially of:
about 59.82% $SiO_2$
about 21.04% $Al_2O_3$
about 4.46% $Na_2O$
about 10.53% $MgO$
about 4.15% $ZrO_2$ 14. A high tensile glass fiber consisting essentially of:
about 54.82% $SiO_2$
about 26.04% $Al_2O_3$
about 1.38% $Na_2O$
about 3.08% $B_2O_3$
about 6.53% $MgO$
about 4.00% $CaO$
about 4.15% $ZrO_2$ References Cited

UNITED STATES PATENTS

| | | | |
|---|---|---|---|
| 2,883,296 | 4/1959 | Labino | 106—50 |
| 3,044,888 | 7/1962 | Provance | 106—50 |
| 3,060,041 | 10/1962 | Loewenstein | 106—50 |
| 3,117,881 | 1/1964 | Henry et al. | 106—39 |
| 3,189,471 | 6/1965 | Thomas | 106—50 |

FOREIGN PATENTS

| | | |
|---|---|---|
| 124,553 | 6/1939 | Australia. |
| 1,099,135 | 2/1961 | Germany. |

HELEN M. McCARTHY, *Primary Examiner.*